(12) United States Patent
Kim et al.

(10) Patent No.: US 10,749,403 B2
(45) Date of Patent: Aug. 18, 2020

(54) MOTOR ASSEMBLY

(71) Applicant: LG ELECTRONICS INC., Seoul (KR)

(72) Inventors: Seongguk Kim, Seoul (KR); Hosuk Kim, Seoul (KR); Heewoon Kim, Seoul (KR); Youngjin Ji, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/676,739

(22) Filed: Nov. 7, 2019

(65) Prior Publication Data

US 2020/0076268 A1 Mar. 5, 2020

Related U.S. Application Data

(63) Continuation of application No. 15/674,721, filed on Aug. 11, 2017, now Pat. No. 10,541,583.

(30) Foreign Application Priority Data

May 30, 2017 (KR) .......................... 10-2017-0067007

(51) Int. Cl.
*H02K 5/20* (2006.01)
*H02K 5/15* (2006.01)
(Continued)

(52) U.S. Cl.
CPC ............... *H02K 5/20* (2013.01); *A47L 9/22* (2013.01); *F04D 17/165* (2013.01); *H02K 5/15* (2013.01); *H02K 5/161* (2013.01); *H02K 9/06* (2013.01)

(58) Field of Classification Search
CPC ........... H02K 5/20; H02K 5/161; H02K 5/15; H02K 5/16; H02K 9/06; H02K 9/02; H02K 9/04; H02K 7/083; F04D 17/165
(Continued)

(56) References Cited

U.S. PATENT DOCUMENTS 5,394,041 A 2/1995 Oberdorfer-Bögel
2008/0050252 A1 2/2008 Ahn
(Continued)

FOREIGN PATENT DOCUMENTS

CN 205622460 10/2016
EP 3 154 167 4/2017
(Continued)

OTHER PUBLICATIONS

European Search Report dated Apr. 16, 2018 issued in Application No. 17181660.6.
(Continued)

*Primary Examiner* — Bryan R Perez
(74) *Attorney, Agent, or Firm* — Ked & Associates, LLP

(57) ABSTRACT

A motor includes a housing that has a bottom with a first bearing accommodation and a cylindrical side surface portion which extends from the bottom; a rotor assembly with a rotation shaft, and a rotor mounted on the rotation shaft and accommodated inside the housing; a stator assembly accommodated inside the housing and surrounding the rotor; a housing cover coupled to an upper end of the housing and having a second bearing accommodation; a flow guide on the housing cover; an impeller connected to the rotation shaft over the flow guide; an impeller cover; a first bearing accommodated in the first bearing accommodation and receiving the rotation shaft; and a second bearing accommodated in the second bearing accommodation and receiving the rotation shaft, the housing cover having a cover body with an opening, connection arms between the second bearing accommodation and the opening portion, and a guide rib.

7 Claims, 6 Drawing Sheets

(51) Int. Cl.
 *F04D 17/16* (2006.01)
 *H02K 9/06* (2006.01)
 *A47L 9/22* (2006.01)
 *H02K 5/16* (2006.01)

(58) Field of Classification Search
 USPC .............................................. 310/257, 60 R
 See application file for complete search history.

(56) References Cited

U.S. PATENT DOCUMENTS

2013/0251560 A1\* 9/2013 Xue ........................ F04D 13/06
 417/410.1
2014/0294578 A1 10/2014 Oh

FOREIGN PATENT DOCUMENTS

| | | |
|---|---|---|
| JP | H03-90119 | 4/1991 |
| JP | 2005-090461 | 4/2005 |
| JP | 2013-136980 | 7/2013 |
| KR | 10-2008-0018744 | 2/2008 |
| WO | WO 2015/186896 | 12/2015 |

OTHER PUBLICATIONS

Chinese Office Action dated Aug. 28, 2019 issued in CN Application No. 201710622223.5.

\* cited by examiner

MOTOR ASSEMBLY

CROSS-REFERENCE TO RELATED APPLICATIONS

This application is a Continuation of U.S. application Ser. No. 15/674,721, filed Aug. 11, 2017, which claims priority under 35 U.S.C. § 119 to Korean Application No. 10-2017-0067007 filed on May 30, 2017, whose entire disclosures are hereby incorporated by reference.

BACKGROUND

1. Field

The present disclosure relates to a motor assembly.

2. Background

Generally, a vacuum cleaner is a household appliance that sucks foreign matter such as dust and collects dust in a separate dust collection portion installed inside a main body thereof. Specifically, a vacuum cleaner requires a high suction force to effectively suck foreign matter, and the intensity of the suction force is proportional to the rotational force of the motor. In other words, the higher the rotational force of the motor, the higher the rotation speed of the fan connected to the motor, and the suction force of the foreign matter is increased.

A motor for the vacuum cleaner of the related art is disclosed in Korean Patent Publication No. 10-2008-0018744 (Feb. 28, 2008). As disclosed in this application, both ends of the rotation shaft of the motor for the vacuum cleaner are supported by an upper bearing and the lower bearing. A rotor assembly is mounted on the rotation shaft between the upper bearing and the lower bearing. The lower bearing is mounted at a center of a bottom portion of the motor housing and the upper bearing is mounted at the center of the bearing housing. The bearing housing is fixed to the upper surface of the motor housing.

At this time, a coupling protrusion which protrudes downward from an outer edge of the bearing housing is inserted into a coupling hole formed on the upper surface of the motor housing so that the bearing housing is fixed to the motor housing. Alternatively, a fastening member such as a screw is inserted into the fastening hole of the motor housing through the edge of the bearing housing in place of the fastening protrusion, and the bearing housing is fixed to the motor housing. Here, for ease of fastening, the diameter of the fastening hole formed on the motor housing is generally slightly larger than the outer diameter of the fastening protrusion. In other words, there is a certain degree of fastening tolerance in which the diameter of the fastening hole is larger than the outer diameter of the fastening protrusion.

Due to the presence of such a fastening tolerance, the bearing housing can be wrongly assembled in the circumferential direction and the radial direction of the motor housing in a state where the fastening protrusion is inserted into the fastening hole. Even if the bearing housing is wrongly assembled in the circumferential direction of the motor housing, since the rotation shaft of the motor is maintained in a state of being matched the center axis of the motor housing, there is no problem.

However, when the bearing housing is wrongly assembled in the radial direction of the motor housing, a phenomenon that the rotation shaft of the motor is eccentric from the center axis of the motor housing by a predetermined angle is generated. Further, due to the eccentricity of the rotation shaft of the motor, the bearing is severely worn out during high-speed rotation, thereby giving a bad influence on the life of the bearing. The shorter life of the bearing means that the life of the motor is shortened.

In addition, recently, there is an increasing demand from consumers for increasing the volume of the foreign matter collection portion and increasing the foreign matter collection amount without increasing the size of the main body of the vacuum cleaner. For this purpose, a method of reducing the size of the motor is proposed. When the size of the motor is reduced, the size of the impeller also becomes smaller. Therefore, in order to prevent the suction force of the motor from decreasing, the rotational speed of the motor has to be increased. As the rotational speed of the motor increases, there is a problem that the life of the bearing due to the eccentricity of the motor rotation shaft is shortened. In other words, under the same eccentricity condition, as the rotational speed of the motor increases, the vibration of the motor rotation shaft becomes large, and the bearing wear becomes worsened. As a result, the bearing life is shortened.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Hereinafter, a motor according to an embodiment of the present disclosure will be described in detail with reference to the drawings.

Figure 1:
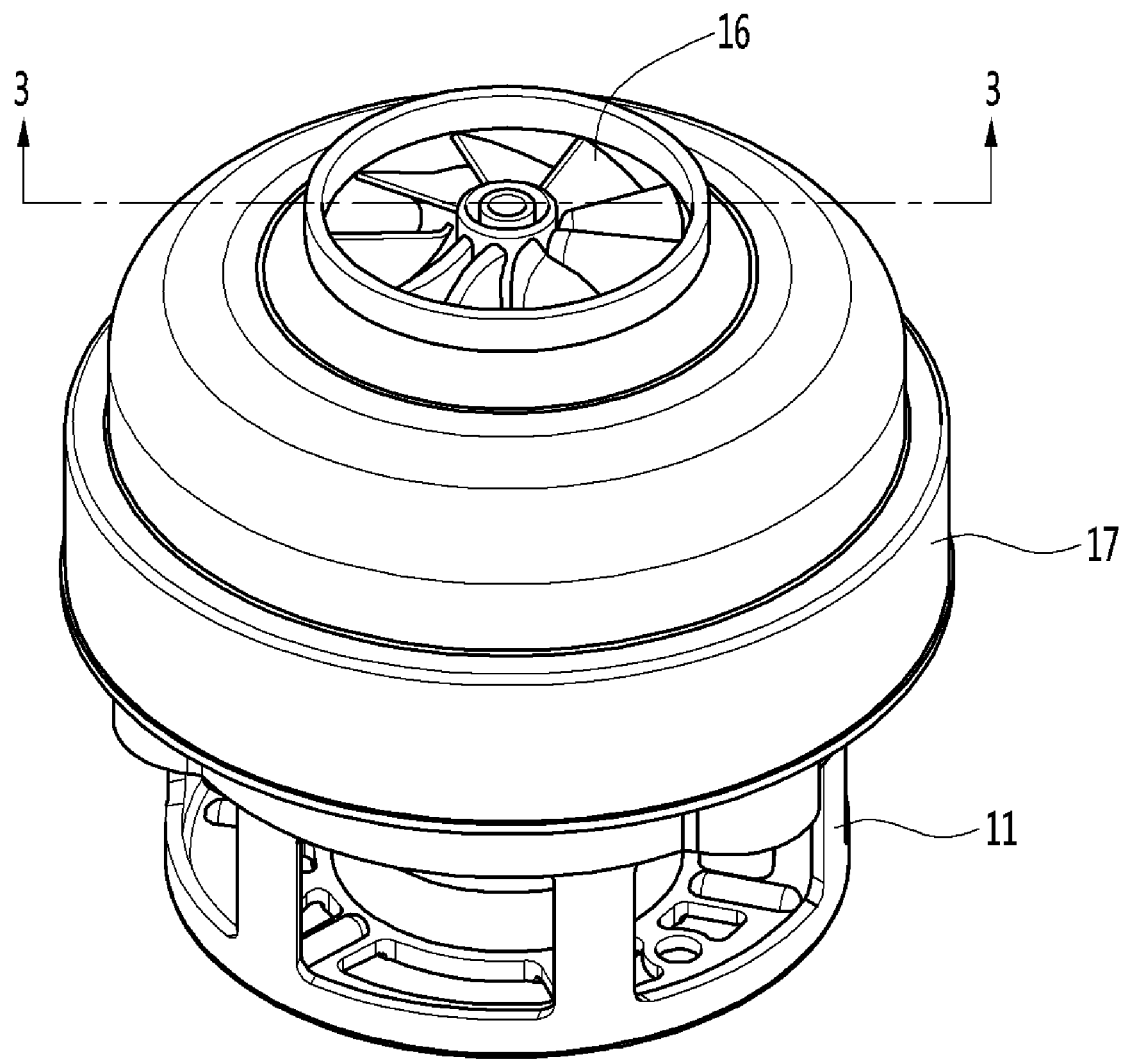
FIG. 1 is a perspective view of a motor according to an embodiment of the present disclosure.
Figure 2:
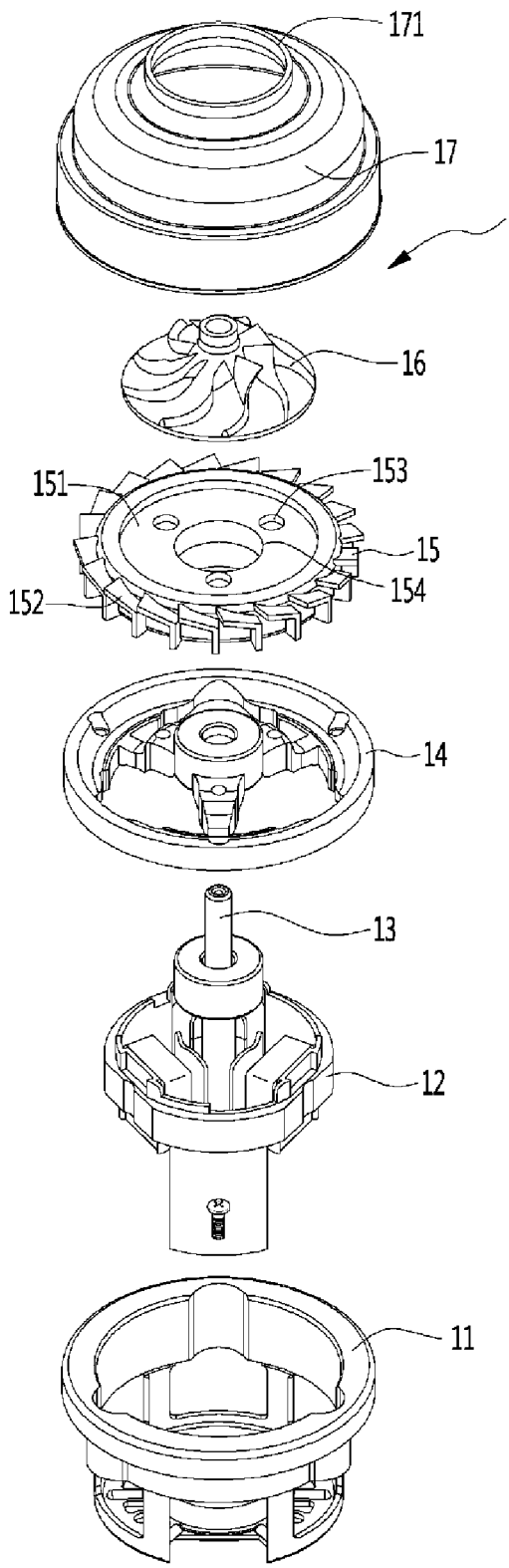
FIG. 2 is an exploded perspective view of the motor.
Figure 3:
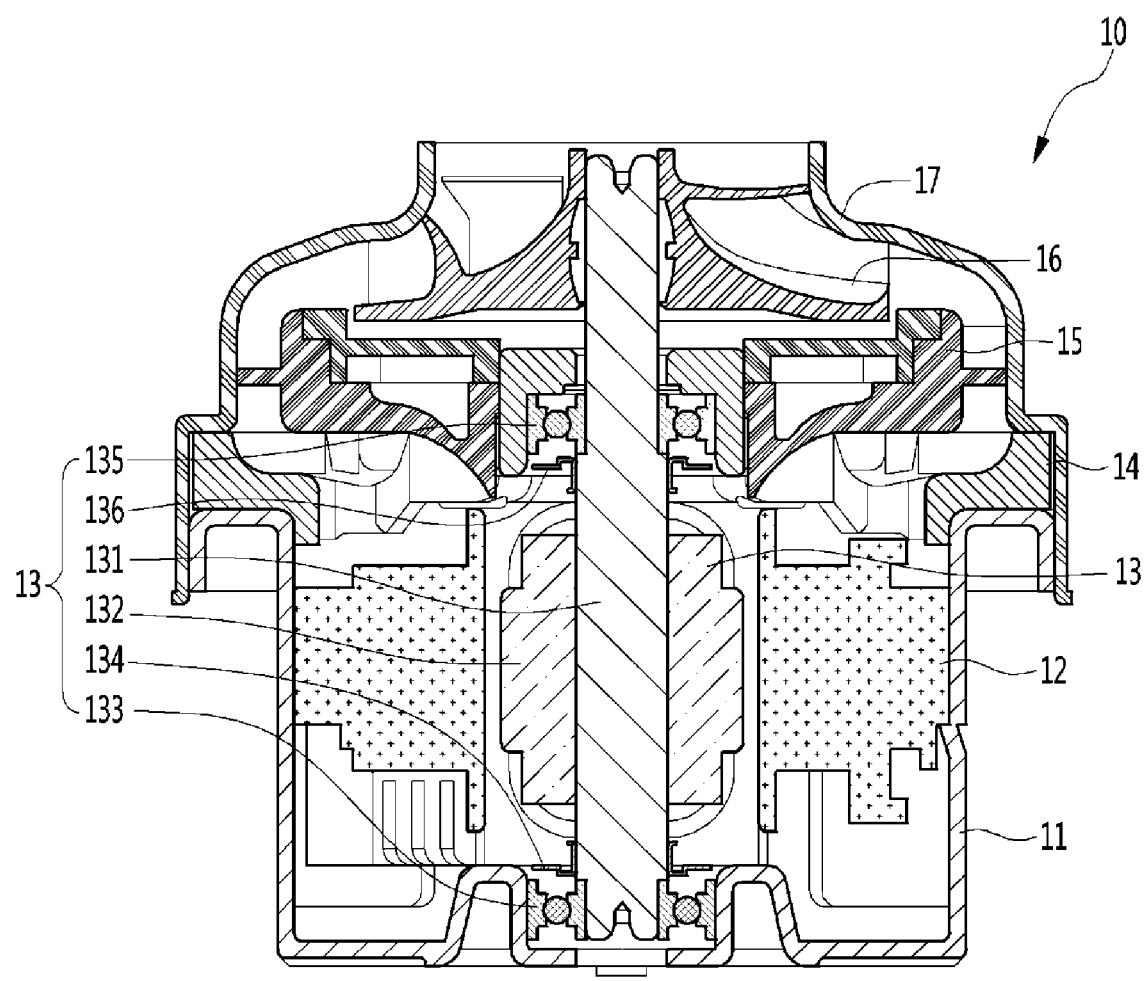
FIG. 3 is a longitudinal sectional view of the motor cut along line 3-3 in FIG. 1.

FIG. 1 is a perspective view of a motor according to an embodiment of the present disclosure, FIG. 2 is an exploded perspective view of the motor and FIG. 3 is a longitudinal sectional view of the motor cut along line 3-3 in FIG. 1. With reference to FIG. 1 to FIG. 3, a motor 10 according to an embodiment of the present disclosure includes a housing 11, a housing cover 14 which is seated on an upper surface of the housing 11, a stator assembly 12 which is fixed to an inside of the housing 11, a rotor assembly 13 which is rotatably installed in an inside portion of the stator assembly 12, a flow guide 15 which is fixed to an upper surface of the housing cover 14, an impeller 16 which is provided on an upper side of the fluid guide 15 and connected to the rotor assembly 13, and an impeller cover 17 which is fixed to the housing 11 to cover the impeller 16. Specifically, an air inlet port 171 is formed on an upper surface (or front surface) of the impeller cover 17, and when the impeller 16 rotates, air outside the motor 10 sucked into the inside portion of the motor 10 through the air inlet port 171.

In addition, the flow guide 15 has a function that guides the air sucked through the air inlet port 171 toward the housing 11. Specifically, the flow guide 15 may include a guide main body 151 having a circular plate shape and a plurality of guide vanes 152 which are formed on an outer circumferential surface of the guide main body 151. A through hole 154 is formed at a center portion of the guide main body 151 and an upper bearing accommodating portion (or upper bearing accommodating surface) 142 (see FIG. 4) formed at the center of the housing cover 14 is inserted into the through hole 154. A plurality of fastening holes 153 may be formed at the edge of the through hole 154.

On the other hand, the rotor assembly 13 may include a rotation shaft 131, a rotor 132 which is fixed to the outer circumferential surface of the rotation shaft 131 and rotates integrally with the rotation shaft 131, an upper bearing 135 which is fitted to the rotation shaft 131 at the front side (or upper side) of the rotor 132, a lower bearing 133 which is fitted to the rotation shaft 131 at a rear end (or lower end) of the rotor 132, an upper stopper 136 which prevents the upper bearing 135 from moving along the rotation shaft 131, and a lower stopper 134 which prevents the lower stopper 133 from moving along the rotation shaft 131. Here, either one of the upper bearing 135 and the lower bearing 133 may be defined as a first bearing, and the other thereof may be defined as a second bearing. Any one of the upper stopper 136 and the lower stopper 134 may be defined as a first stopper and the other thereof may be defined as a second stopper.

The impeller 16 is mounted on the front end (or upper end) of the rotation shaft 131 so that the rotation shaft 131 and the impeller 16 rotate in one body. The rotor 132 rotates by the electromagnetic induction generated between the rotor 132 and the stator assembly 12 and the rotation shaft 131 and the rotor 132 rotate in one body. In addition, when the upper bearing 135 and the lower bearing 133 are not correctly aligned with each other, noise and vibration may occur during the rotation of the motor. Specifically, in a case where the rotation shaft 31 is eccentrically offset from the center line of the motor 10 by a predetermined angle, noise and vibration are increased when the motor rotates at a high speed, and wear of the bearing may occur severely.

This phenomenon occurs because the housing cover 14 cannot be coupled to the housing 11 in a proper position. In other words, due to the dimensional tolerance generated when the diameter of the fastening hole formed on the housing 11 is formed to be larger than the diameter of the fastening member to be inserted into the fastening hole, this phenomenon occurs when the center of the housing cover 14 is wrongly assembled from the center in the radial direction of the housing 11.

Figure 4:
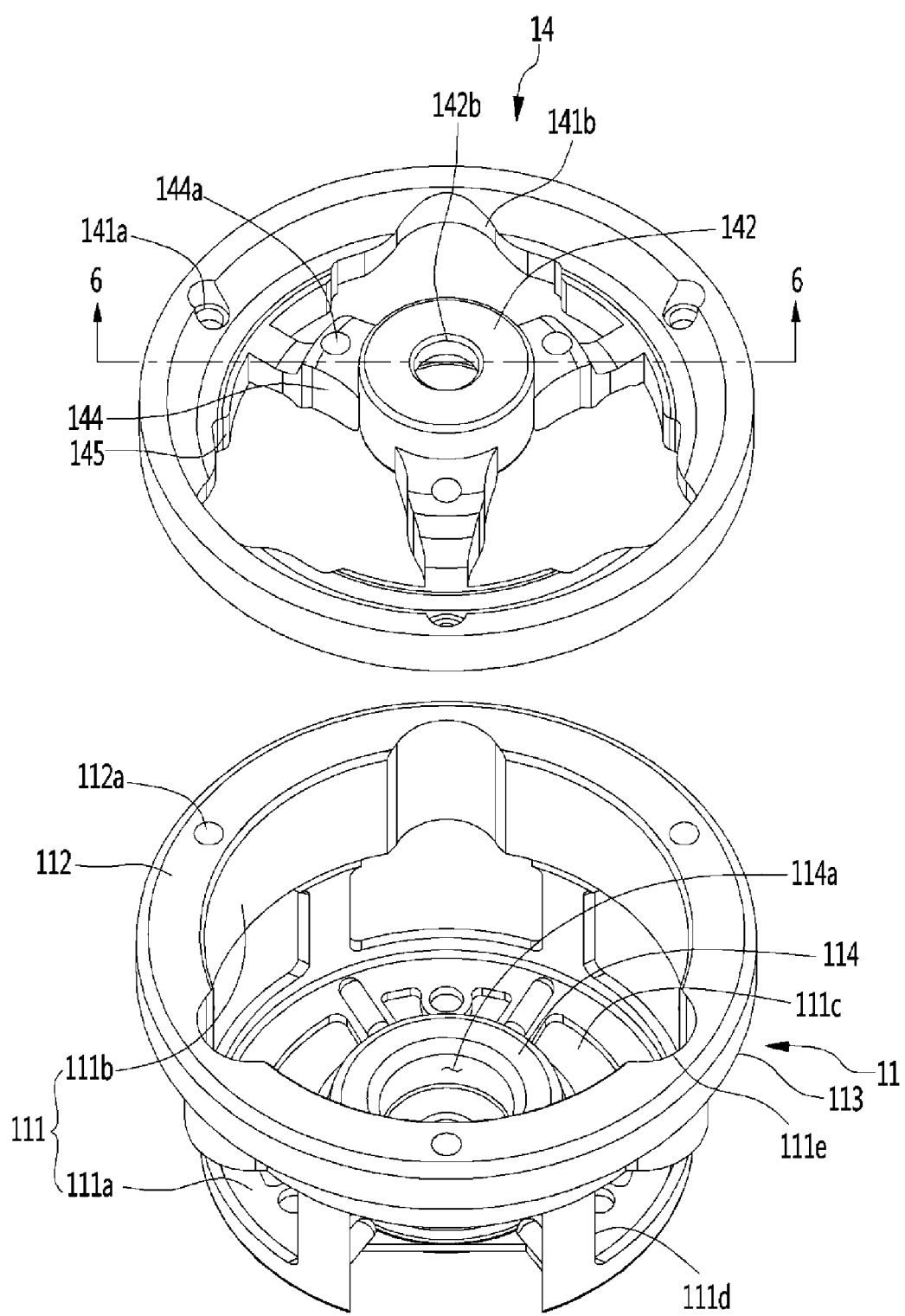
FIG. 4 is an exploded perspective view of a housing and a housing cover constituting a motor according to an embodiment of the present disclosure as viewed from above.
Figure 5:
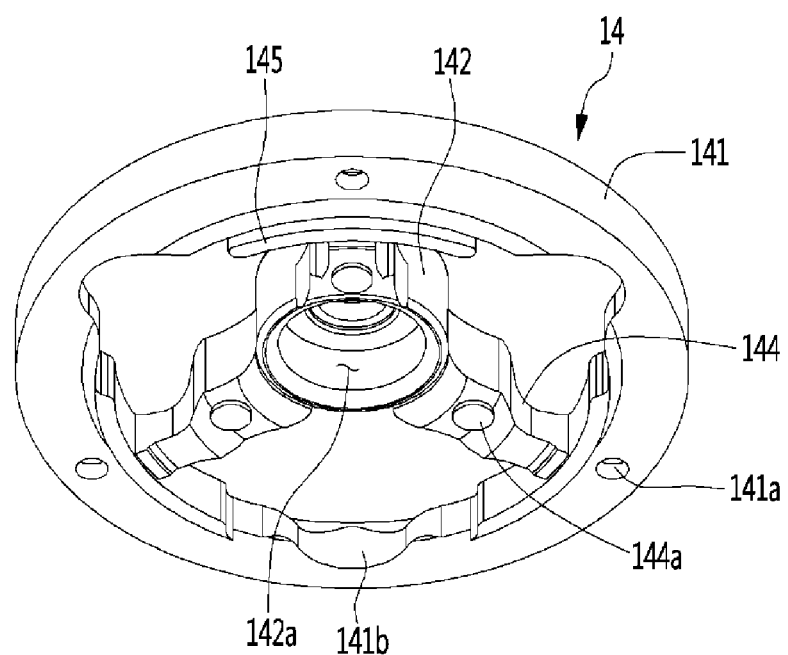
FIG. 5 is an exploded perspective view of the housing and the housing cover as viewed from below.
Figure 5:
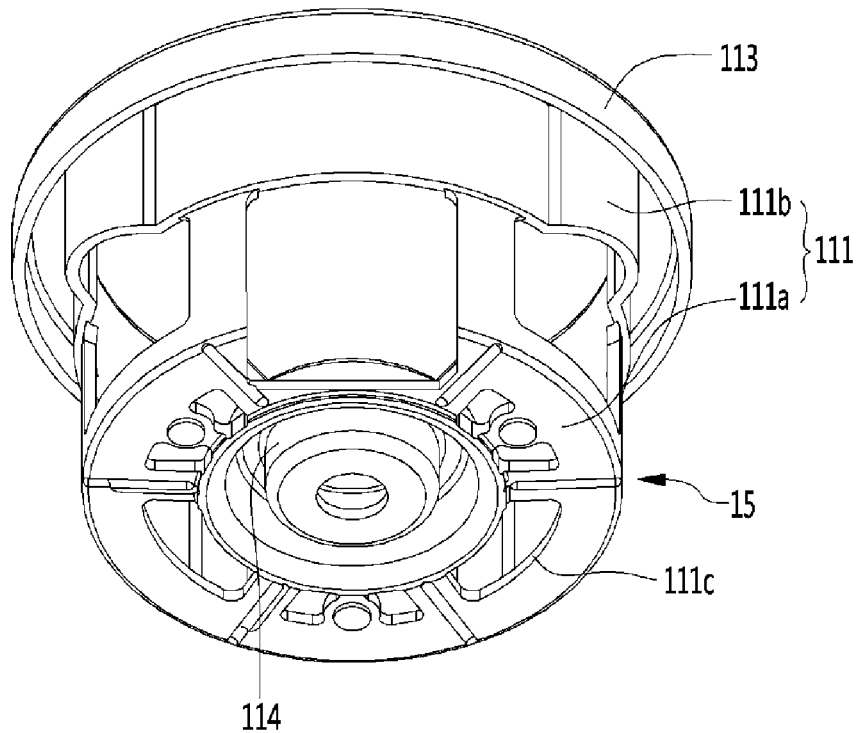
Figure 6:
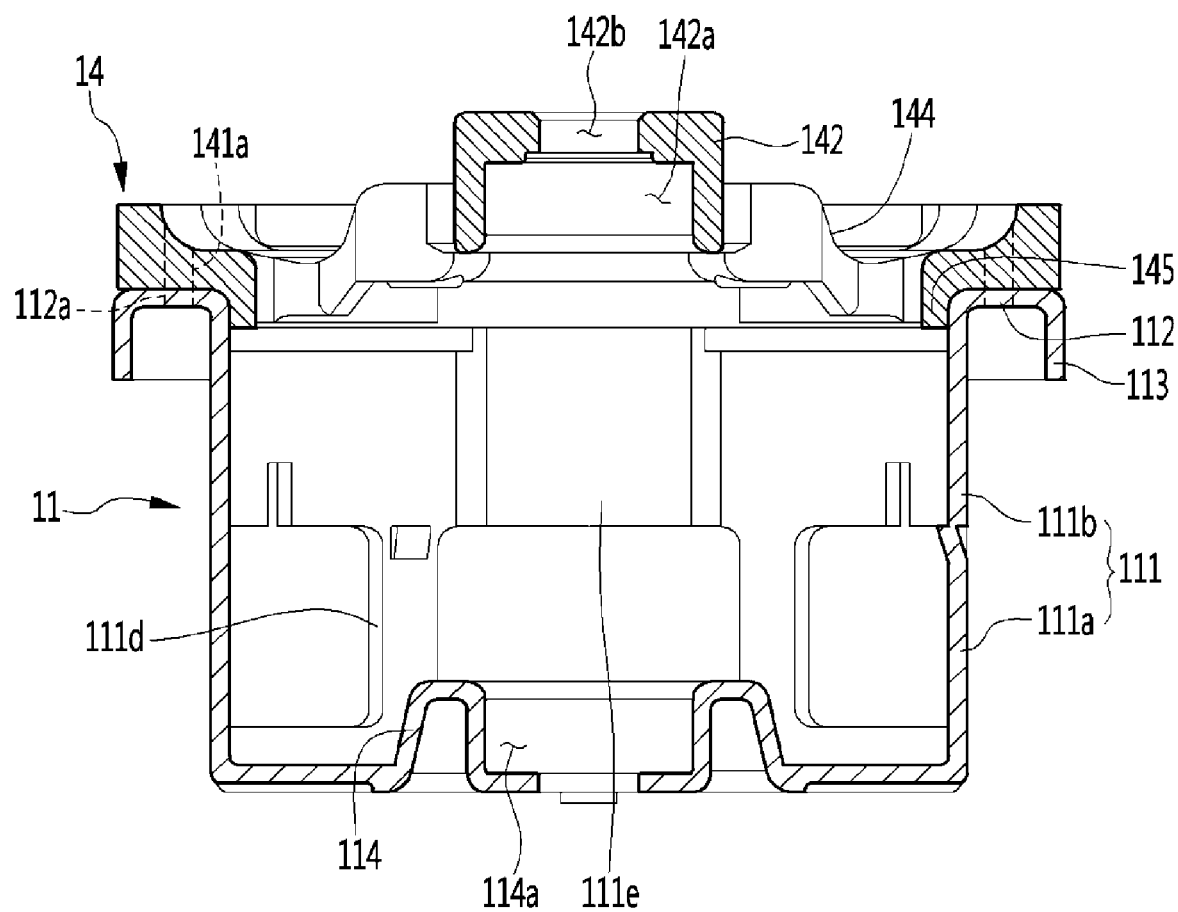
FIG. 6 is a longitudinal sectional view cut along line 6-6 of FIG. 4 in a state where the housing cover and the housing are coupled to each other.

FIG. 4 is an exploded perspective view of a housing and a housing cover constituting a motor according to an embodiment of the present disclosure as viewed from above, FIG. 5 is an exploded perspective view of the housing and the housing cover as viewed from below, and FIG. 6 is a longitudinal sectional view cut along line 6-6 of FIG. 4 in a state where the housing cover and the housing are coupled to each other. With reference to FIG. 4 to FIG. 6, a housing cover 14 according to an embodiment of the present disclosure is coupled to the upper surface of the housing 11.

Specifically, the housing cover 14 supports the upper bearing 135, and the housing 11 supports the lower bearing 133. Accordingly, the alignment of the bearings 133 and 135 is determined according to how the housing cover 14 is coupled to the housing 11. More specifically, the housing 11 includes a housing body 111, a housing cover seating (or housing cover seat) portion 112 bent at the upper end (or front end) of the housing body 111, and a sleeve 113 which is bent again at the end portion of the housing cover seating portion 112.

The housing body 111 may have a circular bottom portion (or bottom layer) 111a and a cylindrical side surface portion (or side surface) 111b extending upward (or forward) from the outer edge of the bottom portion 111a. A plurality of air outlet ports 111c and 111d may be formed on the bottom portion 111a and the side surface portion 111b respectively and the air sucked through the air inlet port 171 of the impeller cover 17 is discharged to the outside of the motor 10 through the air outlet ports 111c and 111d.

In addition, a lower bearing accommodating portion (or lower bearing accommodating surface) 114 may protrude from the center of the upper surface (or front surface) of the bottom portion 111a. Specifically, the lower bearing accommodating portion 114 may protrude upward from the bottom portion 111a in a form of a boss. A bearing accommodating groove 114a may be recessed to a predetermined depth on the inner side of the lower bearing accommodating portion 114. The lower bearing 133 is seated in the bearing accommodating groove 114a.

In addition, the plurality of air outlet portions 111c may be spaced apart in the circumferential direction of the bottom portion 111a along the edge of the lower bearing accommodating portion 114. In addition, a plurality of air guide grooves 111e may be formed on the side surface portion 111b. The air guide groove 111e may be recessed to be rounded at a predetermined curvature in the outside of the side surface portion 111b, that is, in a radial direction of the side surface portion 111b. The curvature radius of the air guide groove 111e may be formed to be smaller than the radius of the side surface portion 111b. The plurality of air guide grooves 111e may be spaced apart equidistantly in the circumferential direction of the side surface portion 111b as illustrated in drawings. Although three air guide grooves 111e are illustrated in the present embodiment, it is not limited thereto.

In addition, the plurality of air outlet ports 111d may be also spaced apart by a predetermined distance in the circumferential direction of the side surface portion 111b. On the other hand, the housing cover seating portion 112 may be bent at an upper end (or front end) of the side surface portion 111b in a direction orthogonal to the side surface portion 111b, that is, in a radial direction of the side surface portion 111b. In addition, a plurality of fastening holes 112a may be formed on the housing cover seating portion 112.

In addition, the circular sleeve 113 bent from the end portion of the housing cover seating portion 112 toward the bottom portion 111a may extend. When the impeller cover 17 is coupled to the housing 11, the outer circumferential surface of the sleeve 113 is in close contact with the inner circumferential surface of the lower end portion of the impeller cover 17 (see FIG. 3). As a result, a swing of the impeller cover 17 in a direction orthogonal to the rotation shaft 131 can be prevented.

On the other hand, the housing cover 14 may include a cover body 141 having a disc plate shape in which an opening portion (or opening) is formed on an inside thereof, an upper bearing accommodating portion 142 which is positioned at the center of the opening portion, and a connection arm 144 which connects the upper bearing accommodating portion 142 and an edge of the opening portion, that is, an inner edge of the housing cover 14.

Specifically, a plurality of outer fastening holes 141a may be formed at a position spaced apart with a predetermined interval in the circumferential direction in the cover body 141, and as an example, although three outer fastening holes 141a may be formed, It is not limited thereto. A fastening (or fastener) member passing through the outer fastening hole 141a is inserted into the fastening hole 112a formed on the housing cover seating portion (or housing cover seat) 112.

In addition, the upper bearing accommodating portion 142 has an n-shaped longitudinal sectional area shape so that a bearing accommodating groove 142a for accommodating the upper bearing 135 may be formed thereon. A shaft through hole 142b is formed on an upper surface of the upper bearing accommodating portion 142 and the rotation shaft 131 is inserted into the center of the impeller 16 through the shaft through hole 142b.

In addition, one end portion of the plurality of connection arms 144 may be connected to the side surface of the upper bearing accommodating portion 142 and an inner coupling hole 144a may be formed on each of the plurality of connection arms 144. A fastening member passing through the fastening hole 153 (see FIG. 2) of the flow guide 15 can be inserted into the inner fastening hole 144a. The centers of the shaft through holes 142b, the inner fastening holes 144a, and the outer fastening holes 141a may be aligned with each other on the same line.

On the other hand, a guide rib 145 may be formed on the inner edge of the cover body 141. Specifically, the guide ribs 145 may extend by a predetermined length in a direction orthogonal to the radial direction of the cover body 141 from an inner edge of the cover body 141. The guide rib 145 may be formed along the inner edge of the cover body 141. The other end portion of the connection arm 144 may be connected to the guide rib 145.

On the other hand, a plurality of air guide grooves 141b which are recessed toward the outer edge of the cover body 141 by a predetermined depth may be formed at an inner edge of the cover body 141. When the housing cover 14 is coupled to the housing 11, the plurality of air guide grooves 141b are aligned with the plurality of air guide grooves 111e formed on the housing 11. Therefore, the curvature of the plurality of air guide grooves 141b may be the same as the curvature of the plurality of air guide grooves 111e.

In addition, the plurality of air guide grooves 141b may be spaced apart from each other in the circumferential direction along the inner edge of the cover body 141 with equal intervals. The guide ribs 145 may be formed along the inner edge of the cover body 141 except for a portion where the air guide grooves 141b are formed. In other words, each of the guide ribs 145 may be defined as being formed between two adjacent air guide grooves 141b to each other. However, it is not excluded that the guide ribs 145 are also formed on a portion where the air guide grooves 141b are formed. In other words, the guide ribs 145 may be formed on a circular sleeve shape along the inner edge of the cover body 141.

On the other hand, the outer diameter of the guide rib 145 may be the same as the inner diameter of the side surface portion 111b constituting the housing body 111. Accordingly, when the housing cover 14 is coupled to the housing 11, the outer circumferential surface of the guide rib 145 is in contact with the inner circumferential surface of the side surface portion 111b. Specifically, when the housing cover 14 is coupled to the housing 11, a dimensional tolerance due to the difference between the diameters of the outer fastening hole 141a and/or the fastening hole 112a, and the outer diameters of the fastening members inserted into the fastening holes 141a and 112a may occur.

Due to the above dimensional tolerance, the housing cover 14 may rotate in the circumferential direction of the housing 11 to cause the fastening positions to deviate from each other. However, even if the housing cover 14 is rotated in the circumferential direction of the housing 11 and the coupling positions are shifted from each other, the centers of the upper bearing 135 and the lower bearing 133 are maintained in a matched state each other. Therefore, it can be said that the rotation of the housing cover 14 due to the dimensional tolerance does not affect the bearing alignment.

On the contrary, when the housing cover 14 is coupled to the housing 11, due to the dimensional tolerance, the housing cover 14 is shifted in a radial direction the housing 11 such that the upper bearing 135 may not be aligned with the lower bearing 133. In other words, the center of the upper bearing 135 may be eccentric in the radial direction of the housing 11. However, in a case of the present disclosure, since the outer circumferential surface of the guide rib 145 is in close contact with the inner circumferential surface of the side surface portion 111b, the housing cover 14 moves in the radial direction of the housing 11 and thus eccentricity of the upper bearing 135 can be prevented.

According to an aspect of the present disclosure, there is provided a motor comprising: a housing that includes a bottom portion on which a first bearing accommodating portion is formed and a cylindrical side surface portion which extends from an edge of the bottom portion; a rotor assembly that includes a rotation shaft and a rotor which is mounted on an outer circumferential surface of the rotation shaft and is accommodated in an inside portion of the housing; a stator assembly that is accommodated in an inside portion of the housing and surrounds the rotor; a housing cover that is coupled to an upper end of the housing and on which a second bearing accommodating portion is formed at a central portion thereof; a flow guide that is seated on the upper side of the housing cover; an impeller that is connected to the rotation shaft at an upper side of the flow guide; an impeller cover that covers the impeller; a first bearing that is accommodated in the first bearing accommodating portion and into which one end portion of the rotation shaft inserted; and a second bearing that is accommodated in the second bearing accommodating portion and into which the other end of the rotation shaft is inserted, in which the housing cover may include a cover body on which an opening portion is formed therein; a plurality of connection arms that connect the second bearing accommodation portion and an edge of the opening portion to each other; and a guide rib that extends from the edge of the opening portion.

In one embodiment, a motor comprises housing that includes a bottom layer on which a first bearing accommodating surface is formed and a side surface which extends from the bottom layer; a rotor assembly that includes a rotation shaft and a rotor which is mounted on an outer circumferential surface of the rotation shaft and is accommodated inside the housing; a stator assembly that is accommodated inside the housing and surrounds the rotor; a housing cover that is coupled to an upper end of the housing and on which a second bearing accommodating surface is formed at a central portion thereof; a flow guide that is seated on an upper side of the housing cover; an impeller that is connected to the rotation shaft at an upper side of the flow guide; an impeller cover that covers the impeller; a first bearing that is accommodated in the first bearing accommodating surface and into which one end of the rotation shaft is inserted; and a second bearing that is accommodated in the second bearing accommodating surface and into which another end of the rotation shaft is inserted, wherein the housing cover includes: a cover body on which an opening is formed; a plurality of connection arms that connect the second bearing accommodating surface and an edge of the opening; and a guide rib that extends from the edge of the opening.

In another embodiment, a motor comprise housing that includes, a bottom layer on which a first bearing accommodating surface is formed, a side surface which extends from the bottom layer, plurality of air guide grooves formed in the side surface; a rotor assembly that includes a rotation shaft and a rotor which is mounted on an outer circumferential surface of the rotation shaft and is accommodated inside the housing; a stator assembly that is accommodated inside the housing and surrounds the rotor; a housing cover that is coupled to an upper end of the housing and on which a second bearing accommodating surface is formed at a central portion thereof; an impeller that is connected to the rotation shaft above housing cover; an impeller cover that covers the impeller; a first bearing that is accommodated in the first bearing accommodating surface and into which one end of the rotation shaft is inserted; and a second bearing that is accommodated in the second bearing accommodating surface and into which another end of the rotation shaft is inserted, wherein the housing cover includes: a cover body on which an opening is formed; a plurality of connection arms that connect the second bearing accommodating surface and an edge of the opening; and a plurality of second air guide grooves recessed from the edge of the opening and towards an outer edge of the cover body, wherein the air guide grooves of the housing cover and the air guide grooves of the housing are vertically aligned.

In another embodiment, a motor comprises: a housing that includes: a bottom layer on which a first bearing accommodating surface is formed; a side surface which extends from the bottom layer; and a housing cover seat which extends from upper end of the side surface and includes a plurality of fastening holes; a rotor assembly that includes a rotation shaft and a rotor which is mounted on an outer circumferential surface of the rotation shaft and is accommodated inside the housing; a stator assembly that is accommodated inside the housing and surrounds the rotor; a housing cover that is coupled to an upper end of the housing and on which a second bearing accommodating surface is formed at a central portion thereof; an impeller that is connected to the rotation shaft above the flow guide; an impeller cover that covers the impeller; a first bearing that is accommodated in the first bearing accommodating surface and into which one end of the rotation shaft is inserted; and a second bearing that is accommodated in the second bearing accommodating surface and into which another end of the rotation shaft is inserted, wherein the housing cover includes: a cover body on which an opening is formed; a plurality of connection arms that connect the second bearing accommodating surface and an edge of the opening; a plurality of outer fastening holes which are formed in the cover body, and wherein a plurality of fasteners pass through the plurality of fastening holes and the plurality of outer fastening holes to couple the housing cover to the housing cover seat.

In the motor according to embodiments of the present disclosure having such a configuration described above, since the guide sleeve extending from the bottom surface of the housing cover is in close contact with the inner circumferential surface of the motor housing, in a process of the housing cover being fastened to the motor housing, there is an effect that the motor cover is not wrongly assembled in the radial direction of the motor housing. Since the rotation shaft of the motor does not deviate from the center axis of the motor, wear of the bearing supporting the rotation shaft of the motor can be minimized in a state where the motor rotates at high speed.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A motor comprising:
   a housing that includes:
      a bottom portion on which a first bearing accommodating portion is formed; and
      a cylindrical side surface portion which extends from an edge of the bottom portion;
   a rotor assembly that includes:
      a rotation shaft; and
      a rotor which is mounted on an outer circumferential surface of the rotation shaft and is accommodated in an inside portion of the housing;
   a stator assembly that is accommodated in the inside portion of the housing and surrounds the rotor;
   a housing cover that is coupled to an upper end of the housing;
   a flow guide that is seated on the upper end of the housing cover;
   an impeller that is connected to the rotation shaft at an upper side of the flow guide;
   an impeller cover that covers the impeller;
   a first bearing that is accommodated in the first bearing accommodating portion and into which a first end of the rotation shaft is inserted; and
   a second bearing that is accommodated in a second bearing accommodating portion and into which a second end of the rotation shaft is inserted,
   wherein the housing cover includes:
      a cover body on which an opening portion is formed therein;
      the second bearing accommodating portion at a central portion thereof
      a plurality of connection arms that connect the second bearing accommodating portion and the cover body; and
      a guide rib that extends from an edge of the opening portion of the cover body, wherein the guide rib is be formed in a circular sleeve shape along the edge of the opening portion of the cover body, wherein the guide rib extends by a predetermined length in a direction orthogonal to a radial direction of the cover body from an edge of the opening portion of the cover body.

2. The motor according to claim 1, wherein a first end of each of the plurality of connection arms is connected to the second bearing accommodating portion and a second end of each of the plurality of connection arms is connected to the guide rib.

3. The motor according to claim 1, wherein the cover body has a disc plate shape in which the opening portion is formed thereinside.

4. The motor according to claim 1, wherein the housing cover further includes a plurality of air guide grooves which are each recessed from the edge of the opening portion towards an outer edge of the cover body, and wherein the guide rib is formed between an adjacent pair of the air guide grooves.

5. The motor according to claim 1, wherein an outer diameter of the guide rib is formed to be equal to an inner diameter of the cylindrical side surface portion, wherein, when the housing cover is seated on the housing, an outer peripheral surface of the guide rib is in contact with an inner peripheral surface of the cylindrical side surface portion.

6. The motor according to claim 1, wherein the housing includes:

a housing cover seating portion which is bent to extend at an upper end of the cylindrical side surface portion; and a plurality of fastening holes which are formed in the housing cover seating portion, wherein the housing cover further includes:

an inner fastening hole which is formed in each of the connection arms, and a plurality of outer fastening holes which are formed in the cover body.

7. The motor according to claim 6, wherein a plurality of fastening members passing through the plurality of fastening holes are inserted into the plurality of external fastening holes.

* * * * *